April 26, 1949.    J. M. HUSH    2,468,295
HYSTERESIS MOTOR
Filed May 15, 1948    2 Sheets-Sheet 1
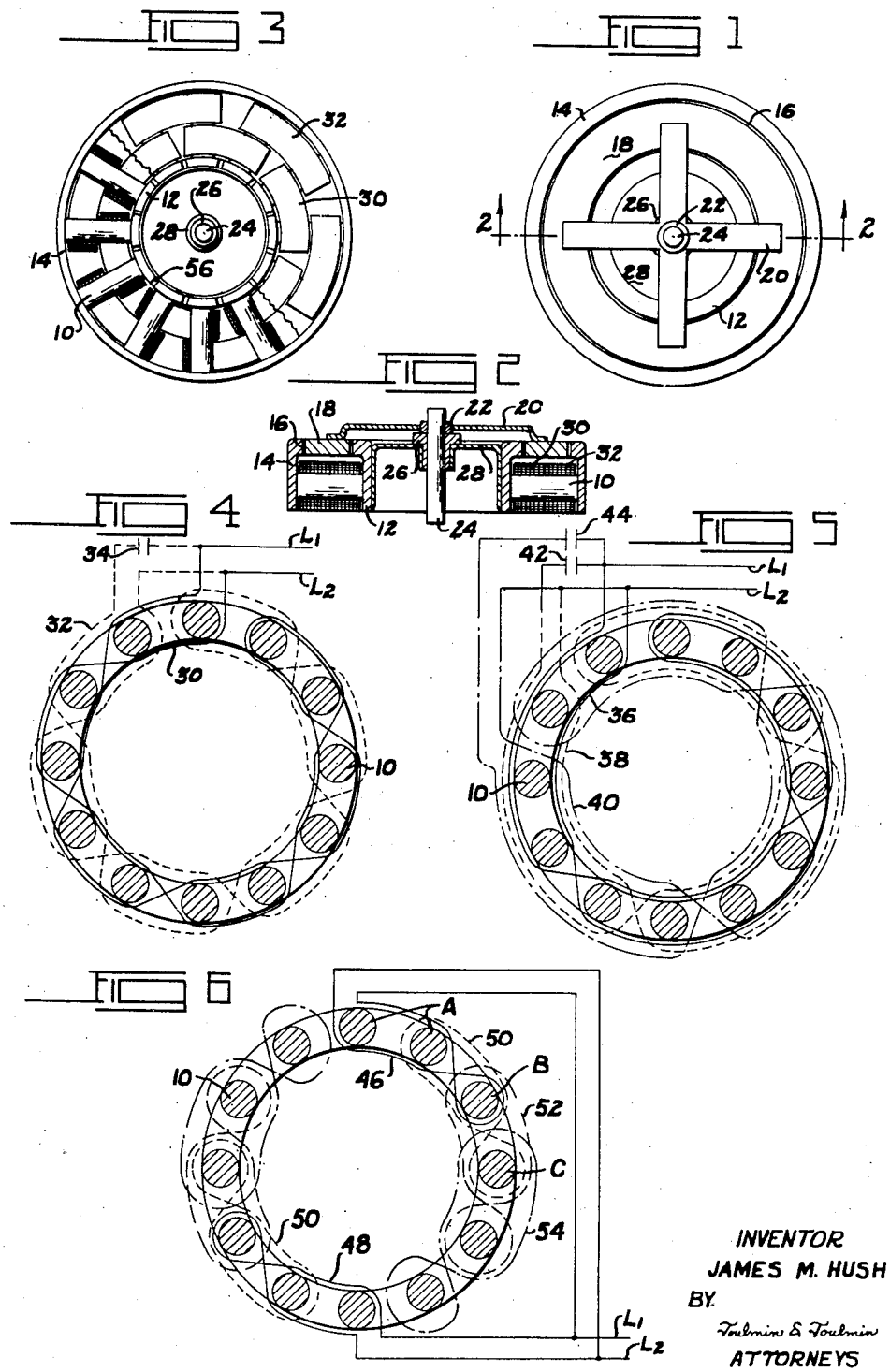
INVENTOR
JAMES M. HUSH
BY
Toulmin & Toulmin
ATTORNEYS April 26, 1949.     J. M. HUSH     2,468,295
HYSTERESIS MOTOR
Filed May 15, 1948                    2 Sheets-Sheet 2
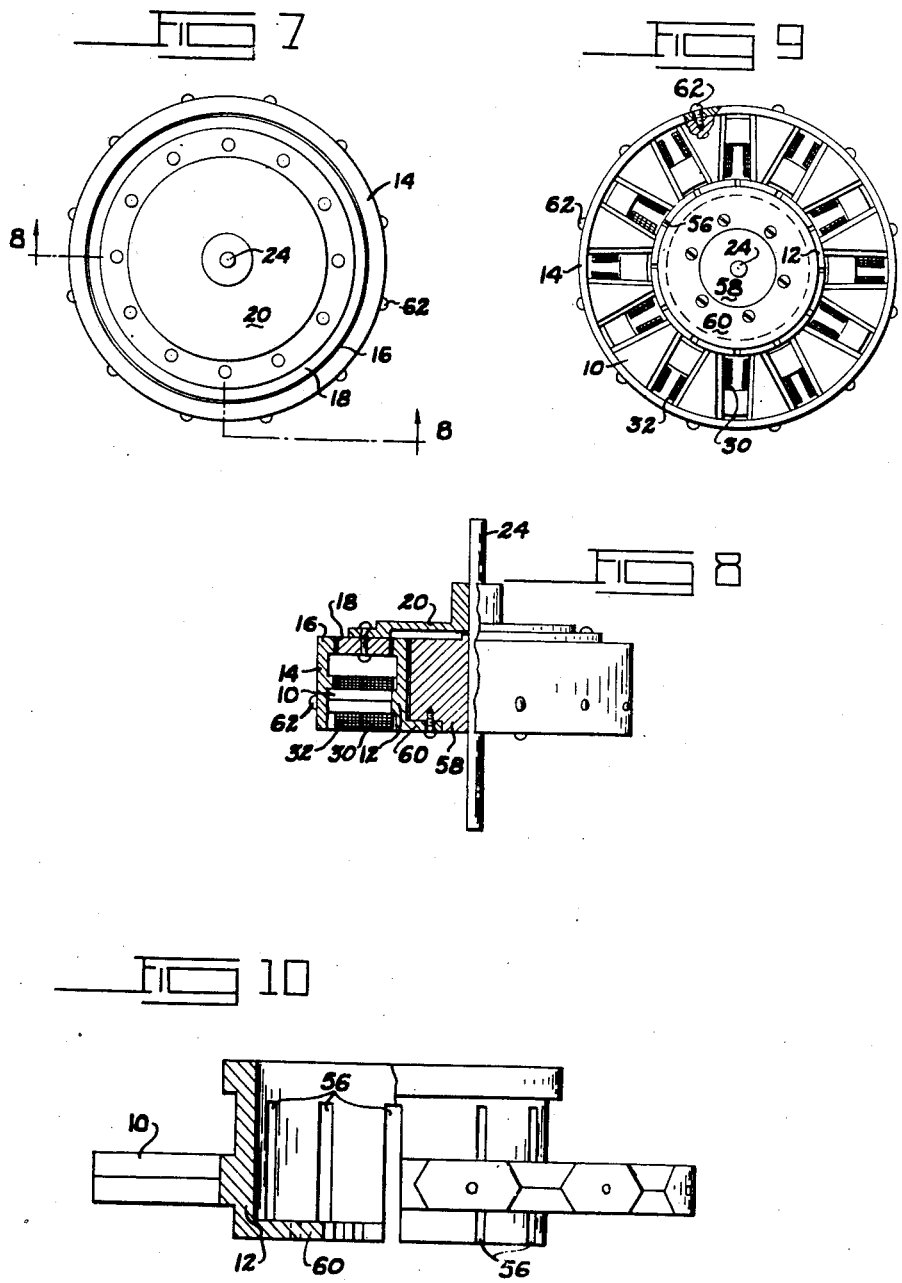
INVENTOR
JAMES M. HUSH
BY
Toulmin & Toulmin
ATTORNEYS Patented Apr. 26, 1949

2,468,295

UNITED STATES PATENT OFFICE 2,468,295

HYSTERESIS MOTOR

James M. Hush, Dayton, Ohio, assignor to Hansen Manufacturing Company, Princeton, Ind., a corporation of Indiana Application May 15, 1948, Serial No. 27,307

18 Claims. (Cl. 172—278)

This invention relates to motors, and particularly to hysteresis type motors adapted for being driven at synchronous speeds for use as clock or timer motors.

Small synchronous motors of the type ordinarily employed for clocks and timers are generally quite inefficient in operation, thus entailing a great waste of power. Also, motors of this type are generally very high speed in operation and in this manner induce rapid bearing wear and noisy operation.

One of the primary objects of the present invention is to provide an improved type motor for use as a clock or timer motor which is very efficient in operation and converts a substantial amount of the electric power delivered thereto into mechanical power at the output shaft.

Still another object is to provide a low speed synchronous type motor which is very quiet in operation.

It is also an object to provide a hysteresis type synchronous motor which is relatively simple and inexpensive to construct.

These and other objects and advantages will become more apparent upon reference to the following description taken in connection with the accompanying drawings in which:

Figures 1 and 3 are top and bottom plan views, respectively, of a motor constructed according to this invention;

Figure 2 is a vertical section through the motor as indicated by the line 2—2 on Figure 1;

Figures 4, 5 and 6 show diagrammatically different coil arrangements for the stator part of the motor;

Figures 7 and 9 are top and bottom plan views, respectively, of another form of the motor constructed according to this invention;

Figure 8 is a side elevation partly broken away as indicated by the line 8—8 on Figure 7; and Figure 10 is a side view partly in section of the stator part of the motor shown in Figures 7 through 9.

Referring to the drawings, the motor shown in Figures 1 through 3 comprises a plurality of substantially radially extending spokes 10 which are connected at their inner ends with a cylindrical magnetic member 12 and at their outer ends with a cylindrical magnetic member 14.

The said cylindrical members extend upwardly from the spokes 10 and define an annular air gap 16 within which is suspended the magnetic rim part 18 of a rotor which also comprises the nonmagnetic spokes 20 which are connected at their inner ends with a hub 22 mounted on the shaft 24.

The shaft 24 is journaled in a bearing 26 carried in the shell 28 which may be pressed inside the inner magnetic cylinder 12. The rim part 18 of the rotor is preferably magnetically retentive to a high degree and to this end comprises a hardened steel member and may even be permanently magnetized if desired. On the other hand, the stator magnetic frame comprising the spokes 10 and the cylinders 12 and 14, is of nonretentive or soft iron material.

A rotating magnetic field is established in the annular space 16 by means of coils wound on the spokes 10. These coils comprise an inner series of coils 30 which are wound alternately in opposite directions about successive pairs of the spokes 10 and an outer series of coils 32 which are similarly alternately wound in opposite directions about successive pairs of the spokes 10 but displaced one spoke from the coils 30. This is diagrammatically illustrated in Figure 4 wherein the coils 30 are shown in full lines and the coils 32 are shown in dotted lines. Optionally, these coils can be made up in the form of honeycomb unitary windings if desired and mounted over the stator spokes, but they can also be wound as individual coils if desired.

In order to establish electric currents through the separate coils which shall have a phase angle therebetween, the coils 30 are connected directly with the alternating current power lines L1 and L2, while the coils 32 are connected with the said power lines through a phase shifting condenser 34. Preferably, the condenser is of such a size that the phase angle between the currents in the two coils is substantially equal to the angular displacement between the coils in electrical degrees. As shown in Figure 4 the coils are displaced 90 electrical degrees and therefore the condenser 34 should be of a substantial size in order to cause the current through the coils 32 to lead that through the coils 30 by substantially 90 degrees.

In Figure 5 there is shown still another winding arrangement wherein there are three coils 36, 38 and 40. Each of these coils is arranged so as to pass in one direction around a group of four spokes and then in the opposite direction around the next group of four, and so on, completely around the stator, and each of the coils is displaced one spoke in a clockwise direction in Figure 5 from the previous one.

In series with the coils 38 there is a condenser 42 and in series with the coils 40 there is a condenser 44. The condensers 42 and 44 are of different sizes so that the current in the coils 40 leads the current in the coils 38 by a predetermined angle, while the current in the coils 48 leads that in the coils 36 by substantially the same amount.

The arrangement in Figure 5 produces a more uniform field than the arrangement of Figure 4. This contributes to the efficiency of operation of the motor because there is less change in the magnetism in the rotor rim 18, it being well known that sudden changes in the field pattern in a hysteresis type motor is accompanied by a loss of power.

Figure 6 illustrates still another form of winding for the stator frame and wherein all condensers and other means for shifting the phase angle of the power supply are eliminated. This is accomplished by winding on the several spokes of the stator frame a plurality of lagging coils so spaced around the circumference of the stator frame that a rotary magnetic field is produced.

Referring to Figure 6 it will be noted that the principal winding 46 is wound in one direction about the first two spokes of the stator field at A and then passes around the next spoke B in the opposite direction. In order to balance the field around the stator frame the coil 46 is duplicated on the opposite side of the stator as at 48.

Spaced one spoke clockwise from the starting points of each of the coils 46 and 48 there are the lagging coils 50. Each of these lagging coils 50 is wound in one direction around the last of the spokes A and spoke B and then in the opposite direction around the spoke indicated at C.

Similarly, a third pair of windings at 52 and a fourth pair at 54 are arranged on the stator frame so that they are successively spaced one spoke farther clockwise than coil 50. The arrangement is such that when the coils 46 and 48 are energized from the power lines L1 and L2, the magnetic field therefrom links with the lagging coils 50. This induces a current flow in the said lagging coils, which is in turn accompanied by a field which has a predetermined displacement relative to the field of the coils 46 and 48. The coils 50 are similarly magnetically linked with coils 52 thereby to induce a current therein while the coils 52 are magnetically linked with the coils 54.

It will be seen, therefore, that energization of the coils 46 and 48 is operable to successively induce currents in the coils 50, 52 and 54 and that the angular displacement of these coils, together with the time displacement of the currents therein, operates to produce a substantially uniform rotary magnetic field in the stator.

It will be noted that, due to the phase difference between the first of any of the spokes surrounded by any one of the coils and the last thereof, each of the said coils passes around the said last spoke in a direction opposite to that from which it passes around the others of the spokes. This is done in order to bring the magneto-motive forces in any one zone of the stator into additive relationship thereby to establish as strong a field as possible across the air gap in which the rotor moves.

From the foregoing description of the magnetic circuits of the stator, it will be observed that often adjacent spokes of the stator have opposite magnetic polarity. For this reason it is preferred to slot one of the cylindrical members 12 or 14 between the adjacent spokes as indicated at 56 in Figure 3. This slot may extend completely through the said cylinder or substantially therethrough and form a path of high reluctance, by means of which the individual spokes of the stator frame are substantially magnetically isolated.

Figures 7 through 10 show a somewhat modified arrangement having substantially identical parts and wherein corresponding parts bear numbers which correspond to those used in Figures 1 through 3.

One of the principal differences between the arrangement of Figures 7 through 10 and that of the previous modification is in the bearing arrangement wherein a bronze bearing block 58 is mounted on a flange 60 extending inwardly from the inner stator ring 12. Another difference will be noted in that the spokes in Figures 7 through 10 are integral with the inner ring 12, while the outer ring 14 is secured to the said spokes by screws 62. The winding placed on the stator frame of the modification of Figures 7 through 10 is substantially identical with that shown and described in Figures 4, 5 and 6, and it will, therefore, be understood that it is not necessary to again describe these circuits.

It will be understood that this invention is susceptible to modification in order to adapt it to different usages and conditions and, accordingly, it is desired to comprehend such modifications within this invention as may fall within the scope of the appended claims.

I claim:

1. In an electric motor; a magnetic frame comprising a plurality of spokes, rings of magnetic material connecting the ends of said spokes and defining an annular space, a rotor comprising magnetically retentive material rotatably suspended in the said space, and coils wound around said spokes for establishing a magnetomotive force across said annular space.

2. In an electric motor; a magnetic frame comprising a plurality of spokes, rings of magnetic material connecting the corresponding ends of said spokes and defining an annular space for receiving a rotor, a rotor comprising magnetically retentive material rotatably suspended in the said space, and serially connected coils embracing successive groups of said spokes and in overlapping relationship for establishing a rotary magnetic field in said annular space.

3. In an electric motor; a magnetic frame comprising a plurality of radial spokes, rings of magnetic material connecting the inner and outer ends of said spokes and defining an annular space at one side, a rotor comprising magnetically retentive material rotatably suspended in the said space, and serially connected coils embracing successive groups of said spokes and other serially connected coils embracing other groups of said spokes and arranged to overlap the first mentioned said coils.

4. In an electric motor; a magnetic frame comprising a plurality of radial spokes, rings of magnetic material connecting the inner and outer ends of said spokes and defining an annular space at one side, a rotor comprising magnetically retentive material rotatably suspended in the said space, coils wound around said spokes for establishing a magnetomotive force across said annular space, and slits in one of said rings extending substantially across the width thereof and thereby magnetically isolating said spokes.

5. In an electric motor; a magnetic frame comprising a plurality of radial spokes, rings of magnetic material connecting the inner and outer ends of said spokes and defining an annular space at one side, a rotor comprising magnetically retentive material rotatably suspended in the said space, coils wound around said spokes for establishing a magnetomotive force across said annular space, slits in one of said rings extending substantially across the width thereof and thereby magnetically isolating said spokes, and journal means for said rotor carried by one of said rings.

6. In an electric motor; a magnetic frame comprising inner and outer rings and a plurality of spokes extending radially therebetween, said rings defining an annular space therebetween, coils wound on said spokes for establishing a magnetic field in said space, a rotor comprising magnetically retentive material suspended in said space, a non-magnetic hub supporting said retentive material, and a shaft supporting said hub.

7. In a hysteresis motor; a magnetic frame comprising a pair of telescoped cylinders and radial spokes therebetween and all thereof of magnetic material, said cylinders defining an annular space at one end, a rotor having a ring of magnetic material of high retention in said space, slots in one of said cylinders between said spokes for substantially magnetically isolating the spokes from each other, windings on said spokes, said windings comprising first and second coils each wound alternately in opposite directions about successive groups of said spokes and angularly spaced, and means for supplying alternating current to said coils.

8. In a hysteresis motor; a magnetic frame comprising a pair of telescoped cylinders and radial spokes therebetween and all thereof of magnetic material, said cylinders defining an annular space at one end, a rotor having a ring of magnetic material of high retention in said space, slots in one of said cylinders between said spokes for substantially magnetically isolating the spokes from each other, windings on said spokes, said windings comprising first and second coils each wound alternately in opposite directions about successive groups of said spokes and angularly spaced, and means for supplying alternating current to said coils, the current in said coils having a phase displacement substantially equal to the angular displacement of said coils in electrical degrees.

9. In a hysteresis type motor; a magnetic frame comprising inner and outer cylinders and radial spokes therebetween all of magnetic material, and the said cylinders defining an annular space, a ring of magnetic material of high retention in said space, slots in one of said cylinders between said spokes for substantially magnetically isolating the spokes from each other, first and second coils each wound alternately in opposite directions about successive groups of said spokes and angularly spaced, means for supplying alternating current to one of said coils, and means for supplying alternating current to the other thereof at a different phase angle, said last mentioned means including a condenser in series with said other coil.

10. In a hysteresis type motor; a magnetic frame comprising inner and outer cylinders and radial spokes therebetween all of magnetic material and the said cylinders defining an annular slit, a ring of magnetic material of high retention in said space, slots in one of said cylinders between said spokes for substantially magnetically isolating the spokes from each other, a plurality of coils each wound alternately in opposite directions about successive groups of said spokes and all angularly spaced from each other, and means for supplying alternating current to said coils, the individual currents in said coils having a phase displacement substantially equal to the angular displacement of said coils from each other.

11. In a hysteresis type motor; a magnetic frame comprising inner and outer cylinders and radial spokes therebetween all of magnetic material, and the said cylinders defining an annular space, a ring of magnetic material of high retention in said space, slots in one of said cylinders between said spokes for substantially magnetically isolating the spokes from each other, coils wound around separate groups of said spokes, said groups and therefore said coils being overlapping, and means for supplying an alternating current to one of said coils.

12. In a hysteresis type motor; a magnetic frame comprising inner and outer cylinders and radial spokes therebetween all of magnetic material, and the said cylinders defining an annular space, a ring of magnetic material of high retention in said space, slots in one of said cylinders between said spokes for substantially magnetically isolating the spokes from each other, a first coil wound around a group of adjacent spokes, other coils wound around successive groups of adjacent spokes so that each successive group includes a part of the preceding group, and means for energizing said first coil with an alternating current.

13. In a hysteresis type motor; a magnetic frame comprising inner and outer cylinders and radial spokes therebetween all of magnetic material, and the said cylinders defining an annular space, a ring of magnetic material of high retention in said space, slots in one of said cylinders between said spokes for substantially magnetically isolating the spokes from each other, a first coil wound around a group of adjacent spokes, other coils wound around successive groups of adjacent spokes so that each successive group includes a part of the preceding group, and means for energizing said first coil with an alternating current, each coil being wound about the last spoke which it encompasses in a direction opposite the direction in which it encompasses the other spokes of its respective group.

14. In a hysteresis type motor; a magnetic frame comprising inner and outer cylinders and radial spokes therebetween all of magnetic material, and the said cylinders defining an annular space, a ring of magnetic material of high retention in said space, slots in one of said cylinders between said spokes for substantially magnetically isolating the spokes from each other, a first coil wound in one direction around two successive spokes and then in the other direction around the next spoke, and a plurality of other coils each similarly wound but which are successively spaced one spoke farther around the frame of the motor.

15. In a hysteresis type motor; a magnetic frame comprising a pair of magnetic annular members spaced apart thereby to define an annular space, a plurality of circumferentially spaced spokes interconnecting said members and also of magnetic material, a rotor comprising a ring of magnetic material rotatably suspended in said space, zones of high magnetic reluctance in one of said members between said spokes for substantially magnetically isolating the spokes from each other, coils wound around separate groups of said spokes, said groups and therefore said coils being overlapping, and means for supplying an alternating current to one of said coils.

16. In a hysteresis type motor; a magnetic frame comprising a pair of magnetic annular members spaced apart thereby to define an annular space, a plurality of circumferentially spaced spokes interconnecting said members and also of magnetic material, a rotor comprising a ring of magnetic material rotatably suspended in said space, zones of high magnetic reluctance in one of said members between said spokes for substantially magnetically isolating the spokes from each other, a first coil wound around a group of adjacent spokes, other coils wound around successive groups of adjacent spokes so that each successive group includes a part of the preceding group, and means for energizing said first coil with an alternating current.

17. In a hysteresis type motor; a magnetic frame comprising a pair of magnetic annular members spaced apart thereby to define an annular space, a plurality of circumferentially spaced spokes interconnecting said members and also of magnetic material, a rotor comprising a ring of magnetic material rotatably suspended in said space, zones of high magnetic reluctance in one of said members between said spokes for substantially magnetically isolating the spokes from each other, a first coil wound around a group of adjacent spokes, other coils wound around successive groups of adjacent spokes so that each successive group includes a part of the preceding group, and means for energizing said first coil with an alternating current, each coil being wound about the last spoke which it encompasses in a direction opposite the direction in which it encompasses the other spokes of its respective group.

18. In a hysteresis type motor; a magnetic frame comprising a pair of magnetic annular members spaced apart thereby to define an annular space, a plurality of circumferentially spaced spokes interconnecting said members and also of magnetic material, a rotor comprising a ring of magnetic material rotatably suspended in said space, zones of high magnetic reluctance in one of said members between said spokes for substantially magnetically isolating the spokes from each other, a first coil wound in one direction around two successive spokes and then in the other direction around the next spoke, and a plurality of other coils each similarly wound but which are successively spaced one spoke farther around the frame of the motor.

JAMES M. HUSH.

REFERENCES CITED

The following references are of record in the file of this patent:

UNITED STATES PATENTS

| Number | Name | Date |
| --- | --- | --- |
| 464,666 | Tesla | Dec. 8, 1891 |
| 620,966 | Rice & Steinmetz | Mar. 14, 1899 |
| 2,437,904 | Adams et al. | Mar. 16, 1948 |